Aug. 28, 1956

D. McDONALD 2,761,031

FREQUENCY SENSITIVE CIRCUIT CONTROL APPARATUS

Filed April 5, 1952

INVENTOR.
Donald McDonald.
BY
Thiess, Olsen & Mecklenburger,
Attys.

United States Patent Office 2,761,031
Patented Aug. 28, 1956

2,761,031

FREQUENCY SENSITIVE CIRCUIT CONTROL APPARATUS

Donald McDonald, Skokie, Ill., assignor to Cook Electric Company, Chicago, Ill., a corporation of Illinois Application April 5, 1952, Serial No. 280,813

5 Claims. (Cl. 200—80)

This invention relates to circuit control apparatus and more particularly to apparatus adapted to control extrinsic circuits to apply voltage to them only when said voltage is within a predetermined frequency range.

It is a principal object of this invention to create improved apparatus which is responsive to a predetermined range of frequencies.

It is a further object of this invention to provide such apparatus which will apply a voltage to a load over such a range.

Control apparatus heretofore proposed which is adapted for circuit control in response to frequency is generally complicated, fragile, and expensive, and usually includes vacuum tubes, tuned resonance circuits, saturable reactors, and the like. Such elements make the design and maintenance of control apparatus difficult.

Therefore, it is a further object of this invention to create an improved compact mechanical frequency responsive control which will employ a minimum of moving parts and will be adapted to withstand the shocks of mobile use.

It is an additional object of this invention to provide such apparatus for control in response to voltages having a frequency within the range of 380 to 420 C. P. S.

It is another object of this invention to provide improved apparatus to accurately control the upper and lower frequency limits of the desired range. Apparatus following the teaching of this invention can control these limits to ±2½ C. P. S. when used in the 400 C. P. S. range.

Further and additional objects of this invention will be manifest from the description, accompanying drawings, and appended claims.

In carrying out this invention in one form, a synchronous motor is provided which drives a switch mechanism having two sets of contacts thereon. The first of said sets of contacts is normally open and adapted to close at a speed corresponding to a frequency of 380 C. P. S. under the centrifugal force created by the rotary motion of the switch mechanism. The second of said sets of contacts are normally closed and adapted to open under centrifugal force at a speed corresponding to a frequency of 420 C. P. S. Thus, by providing series electrical connections for these two sets of contacts, an open circuit will exist for all frequencies below the lower limit of the desired range. At a speed corresponding to said lower limit, the normally open contacts will close to complete the circuit therethrough. This circuit will be complete for all frequencies of periodic voltage within the desired range, and at the upper limit of said range the normally closed contacts will be forced open by centrifugal force, thus opening the control circuit.

For a more complete understanding of this invention reference should now be made to the accompanying drawing, wherein—

Figure 4:
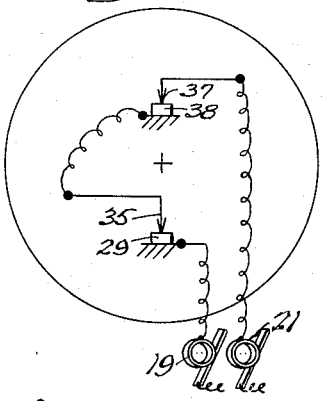
Figure 5:
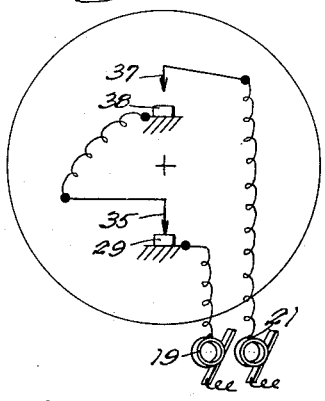
Figure 6:
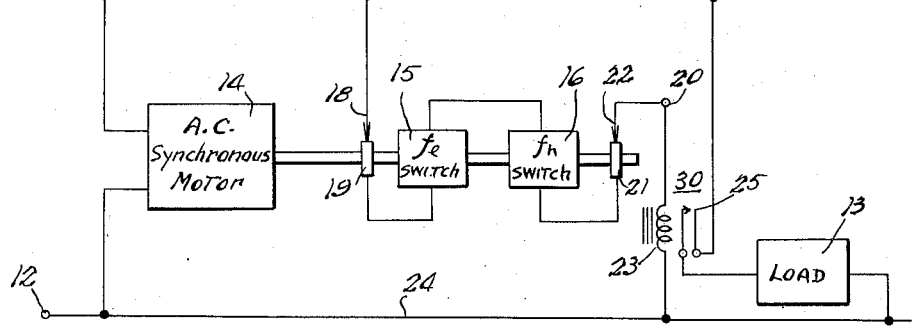

Fig. 4 digrammatically illustrates the contact positions within the desired frequency range;

Fig. 5 illustrates the contact positions for all frequencies above the desired range; and Fig. 6 is a schematic circuit diagram of this embodiment of the invention.

Referring now to the drawings and more particularly to Fig. 6, terminals 11 and 12 are the output terminals of a 400-cycle generator, such as that normally used in aircraft applications. It is desired that the voltage across these terminals be applied to a particular load 13 only when the voltage is of a predetermined frequency. The frequency range for which this embodiment is adapted is the 380 to 420 cycle range. An A. C. synchronous motor 14 is continuously energized from the voltage of the 400-cycle generator and has adapted to its shaft two centrifugal switches: one a normally open switch 15 adapted to close at the lower limit of said range, and the second, a normally closed switch 16 adapted to open at the upper limit of said range. A circuit can be traced from terminal 11 of the 400-cycle generator through conductor 17 and brush 18 adapted to engage rotating slip ring 19. Slip ring 19 is connected to normally open switch 15, which is in series with normally closed switch 16 and a second slip ring 21. Brush 22 is in continuous engagement with slip ring 21 and in series with a relay coil 23 which is connected through conductor 24 to terminal 12 of the 400-cycle generator. This provides a circuit for applying the voltage from terminals 11 and 12 to the coil 23 of control relay 30 for all speeds of synchronous motor 14 which correspond to frequencies of periodic voltage within the predetermined range. Relay coil 23 has normally open switch 25 associated therewith, so that for operating speeds of the A. C. motor corresponding to voltages having frequencies within the predetermined range, a circuit is completed through the two centrifugal switches 15 and 16 to energize relay coil 23, and switch 25 is closed. The voltage of the 400 C. P. S. generator is then applied to load 13.

While a normally open switch 25 is shown herein, it is obvious that a normally closed switch could be substituted therefor in order to provide alarm devices or the like to warn of generator operation not within the desired range.

Figure 1:
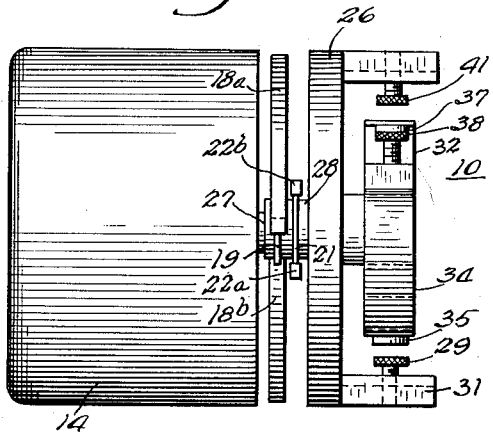
Figure 1 is an elevational view of one embodiment of this invention.

Referring now to Fig. 1, the mechanical structure of this switch mechanism consists of a synchronous motor 14 having a switch frame 26 of some lightweight material, such as aluminum, secured to its rotating shaft 27. Shaft 27 also has an insulating collar 28 secured thereto. Two slip rings 19 and 21 of a conducting material are secured to collar 28 electrically insulated from the shaft 27 but adapted for rotation therewith. Brushes 18a and 18b are adapted to continuously engage slip ring 19, and brushes 22a and 22b engage slip ring 21 to provide fixed terminals for the application of voltage to the rotating switch means 10.

An electrical conductor is connected from slip ring 19 to a contact member 29 mounted on post 44 which is adjustably secured in an insulating leg 31 mounted upon the switch frame 26. A second conductor is connected to slip ring 21 and adapted to supply current to arcuate spring member 32 secured in central member 33.

Figure 2:
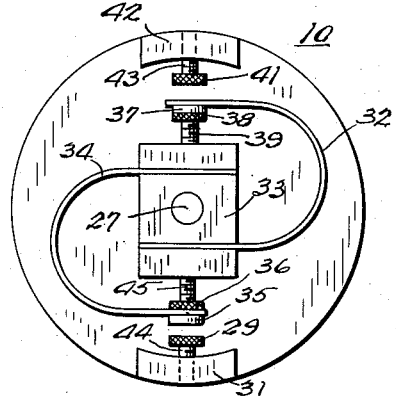
Fig. 2 is an end view of Fig. 1 showing the contact configuration.

An arcuate spring member 34 is secured in the insulating central member 33, as is shown clearly in Fig. 2, and is supported in spaced relation to contact member 29. Spring member 34 has a contact 35 secured to its free end and adapted to engage contact member 29 when this device is rotating at a speed determined by the lower frequency limit. Spring 34 will normally abut against an insulating stop pin 36 mounted on post 45 which is adjustably secured in central member 33. The spring member 34 is so chosen that at the lower limit of the frequency range the centrifugal force will cause spring member 34 to leave its abutted position against stop 36 and cause contact 35 to engage the associated contact 29 and complete an electrical circuit therethrough.

Arcuate spring member 32 is mounted in the insulating central member 33 which is secured to and adapted to rotate with shaft 27. Spring member 32 has a contact 37 secured at its free end. Contact 37 normally engages contact 38 which is adjustably secured by threaded post 39 in the insulating member 33. Contact 38, post 39, and the spring member 34 are in series electrical relation. Spring member 32 is so chosen that at the upper limit of the frequency range of this device the speed of rotation of frame 26 and its associated apparatus will cause sufficient centrifugal force to open the connection between contacts 37 and 38. A stop pin 41 is provided which is adjustably mounted on support 42 by means of threaded shaft 43, and this stop pin 41 will prevent excessive radial motion of spring 32 which might cause strain and distortion of the spring member.

Figure 3:
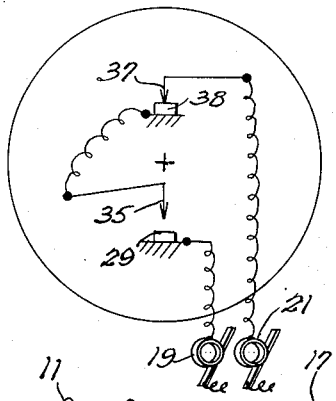
Fig. 3 is a diagrammatic illustration of the contact positions at low speeds.

Figs. 3, 4, and 5 clearly illustrate the operation of this structure for frequencies varying from zero to frequencies beyond the upper control limit. Fig. 3 shows the contact configuration below the lower limit of the frequency range, and shows that contact 35 is not in contact with its associated member 29 while contacts 37 and 38 are closed. Thus an open circuit is presented between slip rings 19 and 21 represented diagrammatically in these three figures.

Fig. 4 illustrates the contact configuration for all speeds within the desired range of control. For such speeds, contacts 35 and 29 are closed, as are contacts 38 and 37. Thus within this range a circuit is completed between slip rings 19 and 21.

The contact configuration for all speeds in excess of the predetermined range, which in this embodiment would be of speeds over 420 C. P. S., is illustrated in Fig. 5. Here normally open contacts 35 and 29 remain closed while the normally closed contacts 37 and 38 have been forced open by the additional centrifugal force. Thus an open circuit is once again presented between slip rings 19 and 21.

Contact members 29 and 38 and stop pins 41 and 36 are all provided with threaded adjustments so that the exact frequency range of this device can be precisely controlled by adjusting these threaded members. The exact speed which will cause contact 35 to engage contact 29 and cause contact 37 to disengage from contact 38 can be determined as well as any desired pretensioning of the springs 32 and 34 for more positive operation.

In this embodiment it was found desirable, in order to secure desired strength with the necessary conservation of weight for aircraft use, to make the major portions of this device, namely, the switch frame 26, of a lightweight material, such as aluminum. The spring members 32 and 34 may be of any desirable spring material, and the material herein employed was an alloy of 48 per cent iron, 42 per cent nickel, and 5 per cent chromium, which was found to have the desired elastic qualities. All of the insulating portions of this embodiment were of Formica.

This entire structure is then sealed into a lightweight compact unit having only three electrical terminals accessible. The unit will have terminals adapted for the generator output at the points 11 and 12 in Fig. 6. Additionally, there is provided a terminal 20 to be connected to the relay coil 23 to control said relay and the associated switch mechanism 25.

While the two switch members are here shown in series relation so that within the predetermined range the closed circuit is provided, it would be within the scope of this invention to provide the two sets of contacts in parallel relation and so adjusted that within the predetermined range of frequencies an open circuit would be presented. Other variations using the teaching of this invention will be manifest to one skilled in the art.

Without further elaboration, the foregoing will so fully explain the gist of my invention that others may, by applying current knowledge, readily adapt the same for use under varying conditions of service without eliminating certain features which may properly be said to constitute the essential items of novelty involved, which items are intended to be defined and secured to me by the following claims.

I claim:

1. Frequency sensitive control apparatus comprising a self-starting synchronous A. C. motor, a switch frame having a central portion and two extending leg portions mounted for rotation with said motor, a first contact means secured in one of said leg portions, a first arcuate spring member having one end secured in the central portion of said frame, a first contact fixed to the nonsecured end of said first spring member in spaced relation to said first contact means, the elasticity of said first spring member being chosen to cause said contact to engage said first contact means at a first predetermined speed of rotation of said frame, a second contact member secured in said central portion, a second arcuate spring member having one end secured in said central portion, and a second contact fixed to the nonsecured end of said second spring to normally engage said second contact member, the elasticity of said second spring being chosen to cause said second contact to disengage said second contact means at a second predetermined speed of rotation greater than said first speed.

2. Frequency sensitive control apparatus to be rotated at a speed corresponding to the frequency of a source, said apparatus comprising a rotatably mounted shaft, a switch frame transversely mounted on said shaft, a centrally disposed hub extending axially from said frame, two leg portions diametrically disposed on said frame and substantially coextensive with said hub, a first arcuate spring member having one end secured in said hub and the free end thereof maintained in spaced relationship to the first of said leg portions, contact means secured in said hub radially aligned with the other of said leg portions and electrically connected to said first arcuate spring member, a second arcuate spring member having one end secured in said central portion and the free end thereof normally in engagement with said contact means, and electrical means to rotatably connect the first of said leg portions and said contact means to extrinsic apparatus to be controlled.

3. Frequently sensitive control apparatus to be rotated at a speed corresponding to the frequency of a source, said apparatus comprising a rotatably mounted shaft, a switch frame transversely mounted on said shaft, a centrally disposed hub extending axially from said frame, two leg portions diametrically disposed on said frame and substantially coextensive with said hub, a first arcuate spring member having one end secured in said hub and the free end thereof maintained in spaced relationship to the first of said leg portions, contact means adjustably mounted in said first leg portion and engageable by said first arcuate spring member, central contact means adjustably secured in said hub radially aligned with the second of said leg portions and electrically connected to said first arcuate spring member, a second arcuate spring member having one end secured in said central portion and the free end thereof normally in engagement with said central contact means, and electrical means to rotatably connect said first leg portion and said contact means to extrinsic apparatus to be controlled.

4. Frequency sensitive control apparatus to be rotated at a speed corresponding to the frequency of a source, said apparatus comprising a rotatably mounted shaft, a switch frame transversely mounted on said shaft, a centrally disposed hub extending axially from said frame, two leg portions diametrically disposed on said frame and substantially coextensive with said hub, a first arcuate spring member having one end secured in said hub and the free end thereof normally maintained in spaced relationship to the first of said leg portions, contact means adjustably mounted in said first leg portion and engageable by said first arcuate spring member, stop means adjustably mounted on said hub in substantial radial alignment with said contact means, central contact means adjustably secured in said hub and electrically connected to said first arcuate spring member, limit means adjustably mounted in the second of said leg portions, said central contact means and said limit means being radially aligned, a second arcuate spring member having one end secured in said central portion and the free end thereof normally in engagement with said central contact means, and electrical means to rotatably connect said first leg portion and said contact means to extrinsic apparatus to be controlled.

5. Circuit control apparatus responsive to the speed of rotation of a body, said apparatus comprising a rotatably mounted shaft, a switch frame transversely mounted on said shaft, a centrally disposed hub extending axially from said frame, two leg portions diametrically disposed on said frame and substantially coextensive with said hub, a first spring member having one end secured in said hub and the free end thereof substantially parallel and diametrically disposed with respect to the secured end thereof and in spaced relationship to one of said leg portions, a second spring member having one end secured in said hub and the free end thereof substantially parallel and diametrically disposed with respect to the secured end thereof, and contact means adjustably secured to said hub and said leg portions and engageable by said spring members at predetermined speeds of rotation.

References Cited in the file of this patent

UNITED STATES PATENTS

| | | |
|---|---|---|
| 1,100,748 | Laycock | June 23, 1914 |
| 2,542,638 | Desch | Feb. 20, 1951 |

FOREIGN PATENTS

| | | |
|---|---|---|
| 187,135 | Switzerland | Jan. 2, 1937 |
| 374,560 | Germany | Apr. 25, 1923 |
| 561,917 | Germany | Oct. 20, 1932 |